United States Patent

Dietz

[15] 3,643,093
[45] Feb. 15, 1972

[54] ULTRAVIOLET DETECTOR SYSTEM

[72] Inventor: John J. Dietz, Cedar Grove, N.J.
[73] Assignee: McGraw-Edison Company, Elgin, Ill.
[22] Filed: May 25, 1970
[21] Appl. No.: 40,248

[52] U.S. Cl. ................250/83.3 UV, 250/43.5 R, 340/227 R
[51] Int. Cl. ..........................................................G01j 3/00
[58] Field of Search ..........................250/83.3 UV, 43.5 R; 340/227 R, 227 F, 233

[56] References Cited

UNITED STATES PATENTS

| | | | |
|---|---|---|---|
| 3,086,108 | 4/1963 | Kaehms | 340/227 F X |
| 3,505,524 | 4/1970 | Hjerten | 250/83.3 UV |
| 3,130,310 | 4/1964 | Biberman et al. | 250/83.3 UV |
| 3,161,863 | 12/1964 | Deziel | 250/83.3 UV |

*Primary Examiner*—Archie R. Borchelt
*Attorney*—George H. Fritzinger

[57] ABSTRACT

A system for detecting only ultraviolet radiation below a cutoff value of 2,900 Angstrom uses a detector means responsive to wavelengths both below and above the cutoff value. Associated partially with the detector means is an optical filter which passes only radiation above the cutoff value. A bridge circuit and the detector means are connected to a source of potential to provide a differential potential across two load resistors proportional only to the radiation below the desired cutoff value. An indicator connected to the bridge circuit responds according to the average differential potential across the load resistors whereby to give an indication only of the U-V radiation whose wavelengths are below the desired cutoff value.

4 Claims, 2 Drawing Figures

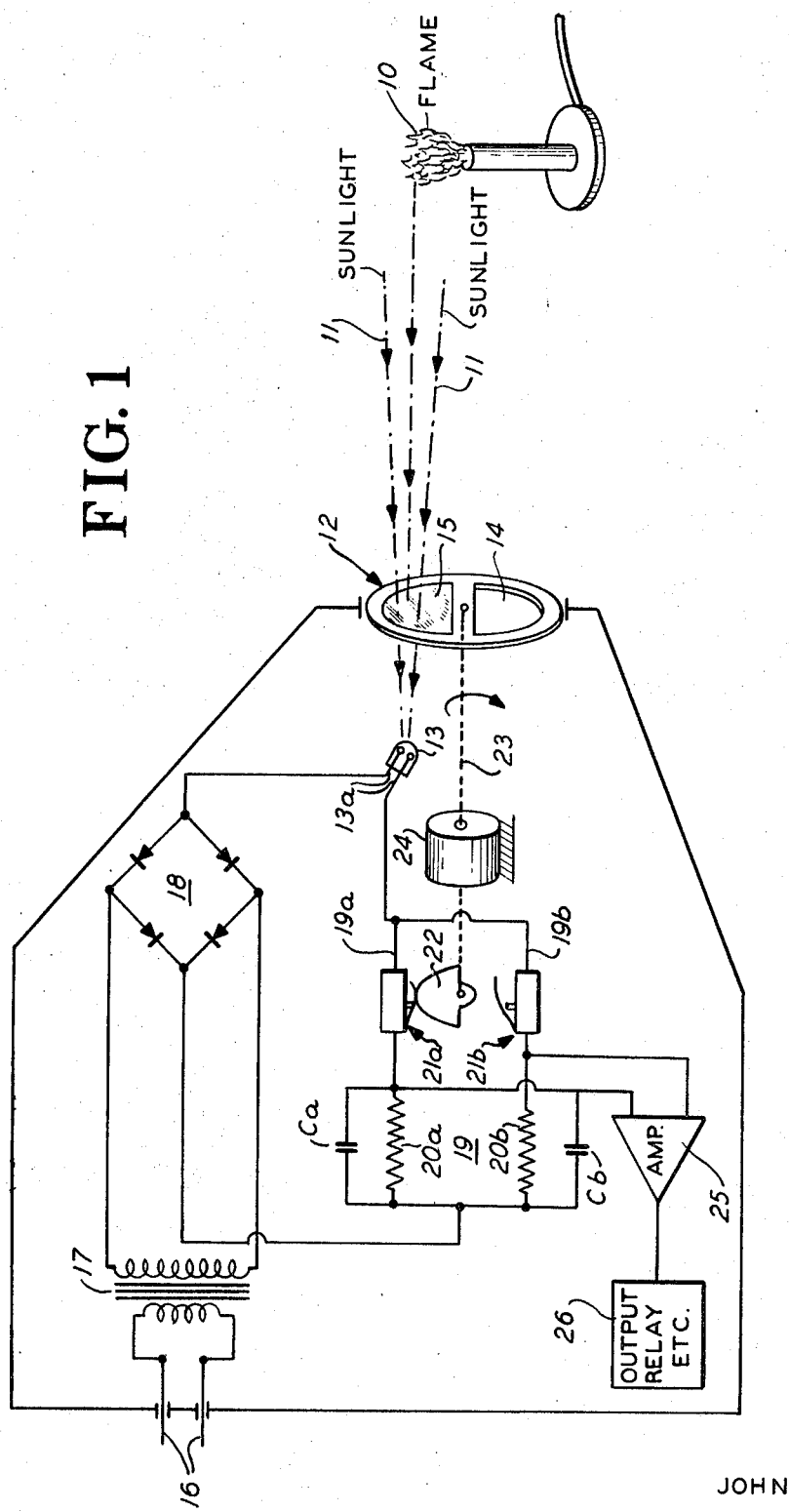

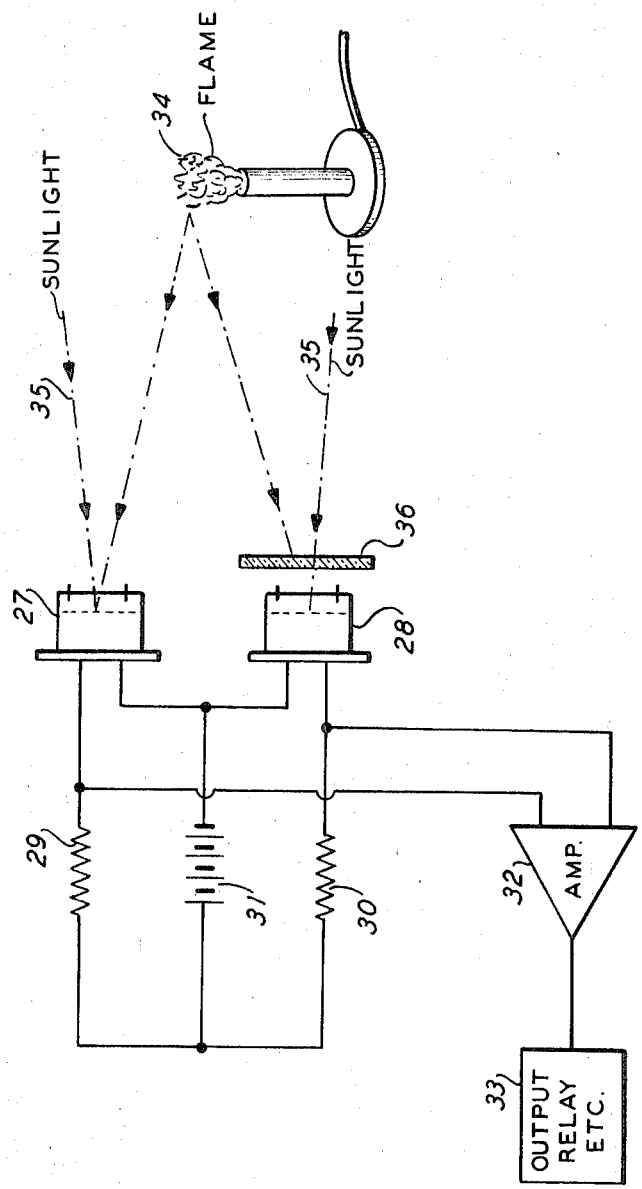

ULTRAVIOLET DETECTOR SYSTEM

In aircraft applications where U-V detectors are employed as flame sensors, it is necessary that the detectors be unresponsive to sunlight at altitudes up to 70,000 feet. The sun rays to these altitudes are only of wave lengths of 2,900 Angstrom and greater since the shorter wavelengths are filtered out by the ozone layers in the upper atmosphere. The U-V detectors should therefore be unresponsive to wavelengths greater than 2,900 Angstrom. A direct approach to this problem is to screen out wavelengths above 2,900 Angstrom by means of a high pass optical filter, but such filters are not commercially available. A second approach is to use detectors with photocathode surfaces whose work functions are higher than 4.3 electron volts—the energy level corresponding to 2,900 Angstrom—since photons of longer wavelengths are not energetic enough to release electrons from such cathode surfaces. However, it is extremely difficult to hold the work function of cathode materials to 4.3 electron volt levels because very small amounts of impurities such as sodium, potassium, cesium, etc., will reduce the work function and render the cathode surfaces responsive to the longer wave lengths in the solar region.

The present invention takes advantage of the fact that low-pass optical filters of an economical and dependable character are commercially available, and resides in a U-V sensing system wherein such low-pass filters are used to obtain a high pass sensing characteristic.

An object of the invention is therefore to provide a flame-sensing system of an economical and dependable character which is blind to solar rays at altitudes to 70,000 feet.

Another object is to provide such improved flame sensing system which is free of the vagaries of frequency selective radiation detectors.

Another object is to provide such improved flame-sensing system which uses readily commercially available radiation detectors responsive throughout both the visible and U-V radiation ranges.

Another object is to provide a practical and economical radiation sensing system which is equivalent to that which would be obtained by a combination of a radiation detector with a high-pass filter.

Another object is to provide such improved flame-sensing system wherein any self counting of the detector is cancelled out so as not to produce any indication.

Another object is to provide an improved flame-sensing system wherein the "noise" resulting from response to sun rays and random long wavelength background radiation does not impose any limitation on the practical sensitivity of the system.

A still further object is to obtain the aforestated advantages through the use of commercial low pass filters and differential load circuits.

These and other objects and features of the invention will be apparent from the following description and the appended claims.

In the description of my invention reference is had to the accompanying drawing, of which:

FIG. 1 is a schematic circuit diagram of a high-pass (short wavelength)-sensing system according to the invention using a Geiger-Mueller type of detector and/or counter tube; and FIG. 2 is a schematic circuit diagram of a high pass (short wavelength) sensing system using solid state resistance-type sensing device.

In the embodiment shown in FIG. 1, a flame 10 to be detected is in the presence of sunlight depicted by rays 11 which would be predominantly of wavelengths above 2900 Angstrom. All of these rays are transmitted through a shutter 12 to a U-V detector 13 of the Geiger-Mueller counter tube type but which is preferably more specifically of the gas-tube electrode-structure type disclosed in the Howling U.S. Pat. No. 3,047,761, dated July 31, 1962. The shutter 12 has one-half portion open and one-half portion closed by a filter passing only the longer wave lengths above the desired cutoff point. Preferably, the open portion is a sector-shaped window 14 of approximately 180° angular length and the closed portion is a sector-shaped optical filter 15—for example a Corning 0-53 filter passing wavelengths above 2,900 Angstrom.

The detector tube 13 has typically 1,000 DC volts applied across its electrode terminals 13a obtained from a 110 volt AC power source 16 via a voltage step-up transformer 17 and full wave rectifier 18. Connected in series with the detector tube is a bridge-type circuit 19 comprising two branches 19a and 19b in parallel of which the respective branches comprise load resistors 20a and 20b and commutator switches 21a and 21b connected in parallel with the load resistors 20a and 20b and respective condensers Ca and Cb. By way of example the commutator switches are shown as push button microswitches operated by a cam 22 of 180° angular length. The cam is on a common shaft 23 with the shutter 12 driven by a motor 24 so that one microswitch, say 21a, is closed to connect the load resistor 20a in circuit when the filter section 15 is in the viewing path of the detector tube and the other microswitch 21b is closed to connect the load resistor 20b in circuit when the open window 14 is in the viewing path. The condensers Ca and Cb integrate the pulses from the detector tube.

Connected diagonally across the bridge circuit is an amplifier 25 feeding into an indicator 26 which may be a relay, meter, etc. The amplifier receives the differential voltage across the load resistors 20a and 20b. Since in the one-half revolution when the filter 15 is in the viewing path only radiation of long wavelengths above the desired cutoff point will reach the detector tube to produce a rate of counts depending on the radiation in the undesired spectrum, and since in the remaining half revolution the detector tube is responsive to produce a rate of count depending on the radiation in both the desired and undesired spectrum, it follows that the differential indication is proportional to the radiation in only the desired spectrum. Further, this is achieved with an economical low pass filter and in a manner to cancel out all radiation in the undesired spectrum, thus permitting the system to be set for maximum sensitivity of response.

The embodiment shown in FIG. 2 is of a simplified character using two U-V detectors 27 and 28 connected in a bridge circuit with respective load resistors 29 and 30. The detectors may be resistance variable solid state Clairex type 7 U-V 20-S sensors. These sensors have resistances which depend on the number of photons to which they are subjected, and are also of a low voltage type permitting the bridge to be powered by a low-voltage battery 31, typically 12 volts. Again, an indicator circuit comprising an amplifier 32 feeding into a meter or relay 33 is connected diagonally across the bridge circuit.

In the viewing path of one detector 28 a low pass (long wavelength) filter 36 allowing only the radiation in the undesired spectrum to reach that detector. The other detector 27 is exposed to the radiation in both the undesired and desired spectrum. Thus, the voltage differential across the bridge to which the indicator 32-33 responds is dependent only on the radiation in the desired spectrum. As before, this alternative embodiment has the same advantages as to economy, dependability and sensitivity as the previous embodiment.

The embodiments of my invention herein particularly shown and described are intended to be illustrative and not necessarily limitative of my invention since the same are subject to changes and modifications without departure from the scope of my invention which I endeavor to express according to the following claims.

I claim:

1. A system for detecting a radiation source only as to wavelengths below a predetermined cutoff value comprising radiation detector means responsive to radiation both above and below said cutoff value, a bridge circuit comprising two branches connected in parallel and a source of potential connected across said branches, means associated with said detector means including filter means passing only radiation above said cutoff value for producing one signal voltage in one branch of said bridge circuit proportional to radiation both above and below said cutoff value and another signal voltage in the second branch of said bridge circuit proportional only to the radiation above said cutoff value whereby to provide a differential voltage diagonally across the bridge circuit proportional only to the radiation below said cutoff value, and indicator means connected diagonally across said bridge circuit.

2. A radiation sensing system responsive to a source of radiation only as to wavelengths below a predetermined value comprising a radiation detector sensitive to wavelengths both above and below said cutoff value, a rotating shutter between said source and detector having a one-half portion freely passing all wave lengths and another half portion with an optical filter passing only wavelengths above said predetermined value, means connecting said detector in series with a voltage source and a bridge-type circuit including two branches in parallel of which each branch includes a load resistor in a first arm and a commutator switch in the second arm, means for driving said commutator switch in synchronism with said shutter whereby one load resistor is connected in circuit while said one-half portion of said shutter is between said detector and radiation source and said other load resistor is connected in circuit while said optical filter is between said detector and radiation source, and indicator means connected diagonally across said bridge-type circuit and responsive according to the difference in average potential across said load resistors for providing an indication only of the radiation whose wave lengths are below said predetermined value.

3. A system for sensing radiation from a source only as to wavelengths below a predetermined cutoff value, comprising two resistance-type detectors responsive as to the photons of excitation thereof, a bridge circuit including two branches in parallel of which one branch serially includes a load resistor and one of said detectors and the other branch serially includes a second load resistor and the other of said detectors, a low-pass filter for passing only long wave lengths above said cutoff value to one of said detectors, a voltage source connected to said bridge circuit, and an indicator circuit connected diagonally across said bridge circuit for producing an indication proportional only to the radiation of wavelengths below said cutoff value.

4. A system for sensing U–V radiation, which is unresponsive to wavelengths of sunlight above 2,900 Angstrom, comprising radiation detector means responsive to wavelengths above and below 2,900 Angstrom, optical filter means associated with said detector means for passing only longer wave lengths above 2,900 Angstrom, differential load circuit means including two load resistors in parallel, means connecting said detector means to said differential load circuit means whereby one load resistor acquires a voltage proportional to the radiation both above and below 2,900 Angstrom and the other load resistor acquires a voltage proportional only to the radiation above 2,900 Angstrom, and indicator means connected across said differential load circuit means for providing an indication according to the difference in potential across said load resistors.

* * * * *